United States Patent
Wang et al.

(10) Patent No.: US 12,488,129 B2
(45) Date of Patent: Dec. 2, 2025

(54) OPERATING METHOD FOR DATABASE AND FULLY ENCRYPTED DATABASE

(71) Applicant: Hangzhou AliCloud Feitian Information Technology Co., Ltd., Hangzhou (CN)

(72) Inventors: Sheng Wang, Singapore (SG); Huorong Li, Beijing (CN); Feifei Li, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/685,212

(22) PCT Filed: Feb. 2, 2023

(86) PCT No.: PCT/CN2023/074268
§ 371 (c)(1),
(2) Date: Feb. 20, 2024

(87) PCT Pub. No.: WO2023/155691
PCT Pub. Date: Aug. 24, 2023

(65) Prior Publication Data
US 2025/0124155 A1   Apr. 17, 2025

(30) Foreign Application Priority Data
Feb. 15, 2022   (CN) .......................... 202210138902.6

(51) Int. Cl.
*G06F 21/62*   (2013.01)
*G06F 21/60*   (2013.01)
(Continued)

(52) U.S. Cl.
CPC ........ *G06F 21/6218* (2013.01); *G06F 21/602* (2013.01); *G06F 16/27* (2019.01)

(58) Field of Classification Search
None
See application file for complete search history.

(56) References Cited

U.S. PATENT DOCUMENTS 8,533,494 B2 * 9/2013 Harada ................. G06F 21/602
                                                        713/193
9,209,973 B2 * 12/2015 Aikas .................... G06F 16/252
(Continued)

FOREIGN PATENT DOCUMENTS

| CN | 1666460 A | 9/2005 |
|----|-----------|--------|
| CN | 101119414 A | 2/2008 |

(Continued)

OTHER PUBLICATIONS

Key-Aggregate Searchable Encryption (KASE) for Group Data Sharing via Cloud Storage. Cui et al. IEEE. (Year: 2016).*

(Continued)

*Primary Examiner* — Venkat Perungavoor
(74) *Attorney, Agent, or Firm* — Maschoff Brennan (57) ABSTRACT

A database operating method and a fully encrypted database are disclosed. The method is executed by a read node in a write once read many database and includes: receiving a reading operation request from a user, determining that a writing operation is required for a data encryption key table in response to the reading operation request; establishing a connection with a write node and forwarding the writing operation; acquiring the data encryption key table that the write node has updated based on the writing operation; generating, based on the updated data encryption key table, a reading operation response and sending the reading operation response to the user. Thus, the present disclosure proposes a write once read many solution applicable to a (Continued)

fully encrypted database, which solves the problem of writing encryption key information of the read node in a distributed database scenario.

20 Claims, 3 Drawing Sheets

(51) Int. Cl.
  *H04L 9/14*     (2006.01)
  *G06F 16/27*    (2019.01)
  *G06F 21/71*    (2013.01)
  *G06F 21/78*    (2013.01)
  *H04L 9/16*     (2006.01)

(56) References Cited

U.S. PATENT DOCUMENTS

| | | | |
|---|---|---|---|
| 9,842,031 B1 | 12/2017 | Kharatishvili | |
| 9,942,208 B2 * | 4/2018 | Lockhart | H04L 63/102 |
| 2007/0113104 A1 * | 5/2007 | Witt | G06F 21/602 |
| | | | 713/193 |
| 2010/0077249 A1 | 3/2010 | Das et al. | |
| 2013/0124856 A1 * | 5/2013 | Agrawal | H04L 63/10 |
| | | | 713/156 |
| 2017/0262640 A1 | 9/2017 | Fan et al. | |
| 2019/0272379 A1 * | 9/2019 | Veeningen | G06F 16/00 |
| 2021/0191880 A1 * | 6/2021 | Ki | G06F 12/1408 |
| 2022/0179973 A1 * | 6/2022 | Swenson | H04L 9/32 |
| 2023/0224153 A1 * | 7/2023 | Avasarala | G06F 21/6218 |
| | | | 713/193 |

FOREIGN PATENT DOCUMENTS

| | | |
|---|---|---|
| CN | 102591964 A | 7/2012 |
| CN | 108055133 A | 5/2018 |
| CN | 111427860 A | 7/2020 |
| CN | 114722115 A | 7/2022 |

OTHER PUBLICATIONS

Personalized Search Over Encrypted Data With Efficient and Secure Updates in Mobile Clouds. Li et al. (Year: 2018).*
Khafagy et al., Hybrid-Key Stream Cipher Mechanism for Hadoop Distributed File System Security, 2020 International Conference on Innovative Trends in Communication and Computer Engineering, Feb. 2020, 5 pages, Aswan Egypt.
Wen Li Feifei, One-stop cloud native distributed data service helps digital transformation of financial industry, Academic Frontier, 2022, 9 pages, China Academic Journal Electronic Publishing House, China.
Chinese Office Action, as issued in connection with Chinese Application No. 202210138902.6, dated Jul. 12, 2024.
International Search Report and Written Opinion, as issued in connection with International Patent Application No. PCT/CN2023/074268, dated Jun. 23, 2023.
Steve Abraham, "Building globally distributed MySQL applications using write forwarding in Amazon Aurora Global Database", AWS Database Blog, Jun. 19, 2020.

* cited by examiner

OPERATING METHOD FOR DATABASE AND FULLY ENCRYPTED DATABASE

CROSS-REFERENCE TO RELATED APPLICATIONS

The present application is a national stage of International Application No. PCT/CN2023/074268, filed on Feb. 2, 2023, which claims the priority to Chinese Patent Application No. 202210138902.6, entitled "Operating Method for Database and Fully Encrypted Database" and filed with the China National Intellectual Property Administration on Feb. 15, 2022. Both of the aforementioned applications are hereby incorporated by reference in their entireties.

TECHNICAL FIELD

The present disclosure relates to the field of databases and, in particular, to an operating method for a database and a fully encrypted database.

BACKGROUND

A fully encrypted database encrypts data in a full link (from a client to a database instance, including a network, a memory and a storage), and aims to eliminate a risk of data leakage at any time during an operation of the database and stop a possibility of a platform and operation personnel accessing plaintext data, and ensure that users have full ownership of their data on a cloud.

Since a content stored in the fully encrypted database is encrypted by using data encryption key pairs, how to store and update data encryption key information in a distributed database architecture is an important issue involving a security and operational efficiency of a fully encrypted database.

Therefore, an improved data encryption key information processing solution is needed.

SUMMARY

A technical problem to be solved by the present disclosure is to provide a database operating solution, which provides a write once read many database architecture for a fully encrypted database, and unifies encryption key table writing operations involved on a read node to a write node to ensure a timely updating and synchronization of the encryption key table.

According to a first aspect of the present disclosure, an operating method for a database is provided. The database is a write once read many fully encrypted database including a write node and a plurality of read nodes, where the method includes: receiving a reading operation request from a user; determining that a writing operation is required for a data encryption key table in response to the reading operation request, where the data encryption key table stores multiple data encryption keys for encrypting data stored by the user in the database; establishing a connection with the write node and forwarding the writing operation; acquiring the data encryption key table that the write node has updated based on the writing operation; and generating, based on the updated data encryption key table, a reading operation response and sending the reading operation response to the user.

In an embodiment, the receiving the reading operation request from the user includes: receiving the reading operation request from the user forwarded by a proxy server connected to the write node and the plurality of read nodes in the database, where the reading operation request does not involve a writing operation on encrypted user data stored in the database.

In an embodiment, the determining that the writing operation is required for the data encryption key table in response to the reading operation request includes: determining that the reading operation involves a change to a data structure of the encrypted user data stored in the database; and determining the writing operation for the data encryption key table involved in the change.

In an embodiment, the establishing the connection with the write node and forwarding the writing operation includes: acquiring connection address information of the write node and authentication information required to connect to the write node; and establishing, based on the acquired connection address information and the acquired authentication information, a connection with the write node.

In an embodiment, the acquiring the connection address information of the write node includes: acquiring the connection address information of the write node from an internal table of a cluster where the write node is located, where the connection address information includes IP address information and port number information of the write node.

In an embodiment, the acquiring the authentication information required to connect to the write node includes: acquiring a user name and password information of a built-in role within the database as the authentication information required to connect to the write node.

In an embodiment, the acquiring the user name and the password information of the built-in role within the database as the authentication information required to connect to the write node includes: acquiring, from a global variable WalRcv loaded upon a startup of a node which is as one of the read nodes, a user name and password information of a WalRcv user of the database; using the user name and the password information of the WalRcv user as the authentication information required to connect to the write node.

According to a second aspect of the present disclosure, a fully encrypted database is provided, including: a proxy server, configured to acquire a request from a user and distribute the request; and a write node, configured to receive a write request from the user distributed by the proxy server and respond to the write request; and a plurality of read nodes, configured to receive a read request from a user distributed by the proxy server and respond to the read request, and to execute the operating method according to the first aspect.

In an embodiment, the write node is further configured to: synchronize, in response to updating a data encryption key table based on a writing operation, the updated data encryption key table to the plurality of read nodes.

According to a third aspect of the present disclosure, a computing device is provided, including: a processor; and a memory, having executable codes stored thereon, where when the executable codes are executed by the processor, the processor is caused to execute the method according to the first aspect.

According to a fourth aspect of the present disclosure, a non-transitory machine readable storage medium is provided, having executable codes stored thereon, where when the executable codes are executed by a processor of an electronic device, the processor is caused to execute the method according to the first aspect.

Therefore, the present disclosure proposes a write once read many solution applicable to a fully encrypted database, which solves the problem of writing encryption key information of a read node in a distributed database scenario. The solution may use a remote SQL technology to realize a connection between the read node and a write node, and when a read request of a user processed by the read node involves the writing of the encryption key information, through the above connection with the write node, an actual writing of the encryption key information may be completed by the write node, and a password table may be synchronized by using a synchronization function of the database, so as to avoid additional security risks and trust issues caused by external password table access.

BRIEF DESCRIPTION OF DRAWINGS

The above and other purposes, features and advantages of the present disclosure will become more apparent by describing the exemplary implementations of the present disclosure in more detail with reference to the accompanying drawings, where same reference numbers generally refer to same parts in the exemplary implementations of the present disclosure.

DESCRIPTION OF EMBODIMENTS

Preferred implementations of the present disclosure will be described in detail below in conjunction with the accompanying drawings. Although preferred implementations of the present disclosure are shown in the drawings, it should be understood that the present disclosure may be realized in various forms and should not be limited to the implementations illustrated herein. In contrast, these implementations are provided to make the present disclosure more thorough and complete, and to completely convey the scope of the present disclosure to those skilled in the art.

"Fully encrypted database", as the name implies, encrypts data in a full link (from a client to a database instance, including a network, a memory and a storage), and can ensure that data exists in an encrypted form throughout transmission, use, and storage, while still possessing a complete database query capability. Due to a full link encryption, only necessary operations are performed on TEE (Trusted Execution Environment, this execution environment usually provides a secure execution environment isolated from an outside world, protecting its codes and data from leakage or malicious tampering), platform maintenance personnel and all other personnel who may have access to the data can thus be prevented from stealing plaintext data, ensuring that users have complete ownership of their data on the cloud.

Figure 1:
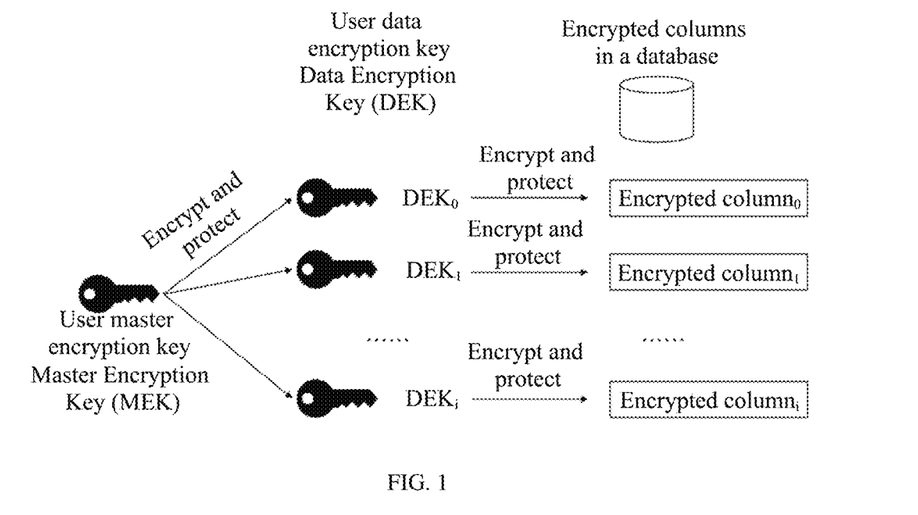
FIG. 1 shows an implementation example of performing data encryption in a fully encrypted database.

FIG. 1 shows an implementation example of performing data encryption in a fully encrypted database. As shown in the figure, in the database instance, a user master encryption key (MEK for short) and a user data encryption key (DEK) can be used to encrypt columns in the database to protect data security of sensitive data.

The user master encryption key is used to encrypt the user data encryption key. As shown in FIG. 1, each encrypted column in the database may be equipped with a data encryption key DEK, and these data encryption keys may be stored together in a data encryption key table. The user master encryption key cannot be obtained by anyone other than the data owner.

A selected database column is encrypted with the user data encryption key. If there are a plurality of columns needed to be encrypted and protected, the plurality of columns may be encrypted by using multiple DEKs respectively. A data encryption key may be accessed by a third party with a user authorization.

Therefore, for a data owner, since the data owner has the user master encryption key and the data encryption key, the data owner may use the encryption key to encrypt the data on a client side, perform various queries and transactions on the database, and see query results after a decryption with an encryption key.

For database maintenance personnel and any other relevant personnel of a cloud platform, since the user master encryption key cannot be obtained and the user data encryption key cannot be accessed without authorization, the database may be maintained or other functions of the database may be used, but the plaintext of the encrypted column cannot be viewed.

As a result, the fully encrypted database may ensure that:
(1) authorized users may normally read and write data in a cloud database through existing protocols;
(2) unauthorized users cannot obtain the plaintext data of protected users;
(3) during a process of providing data services, the cloud database cannot obtain the plaintext data of the user throughout the process.

Some existing encrypted databases use an external encryption key management system to manage encryption keys. In a distributed scenario of the database, each node of these encrypted databases independently requests encryption key information from the external encryption key management system. This solution requires each node to have access to the external encryption key management system, and users need to additionally trust the encryption key management system.

However, in actual applications, for security reasons, the cloud database usually deploys a database instance node in an isolated network or an independent VPC (virtual private cloud) network to avoid malicious attacks from the outside. Therefore, for the fully encrypted database, an introduction of the external encryption key management system will increase a potential security threat to the system to a certain extent. Therefore, in the implementation of the present disclosure, the data encryption key (DEK) used to encrypt the encrypted columns of the database as described above may be centrally stored in the data encryption key table, and the data encryption key table may be stored in the database instance node. This avoids the introduction of external encryption key management system, and ensures the security of the data encryption key table through a secure deployment and disposal of the database instance node itself, thus ensuring the security of encrypted data.

Figure 2:
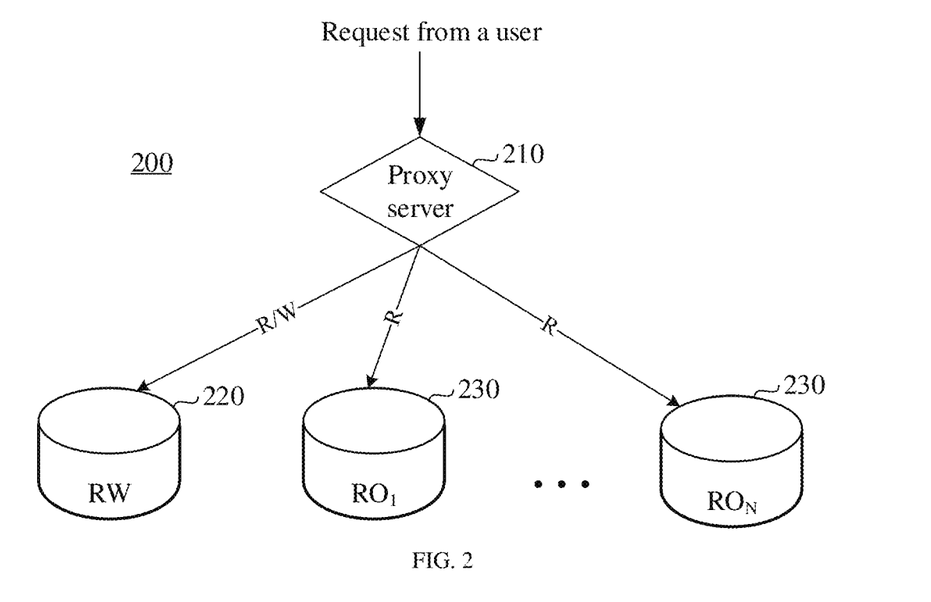
FIG. 2 shows an example of database architecture for realizing an operating method for a database of the present disclosure.

Furthermore, the present disclosure proposes a write once read many solution applicable to a fully encrypted database to solve the problem of writing encryption key information of a read node in a distributed database scenario. FIG. 2 shows an example of a database architecture for realizing an operating method for a database of the present disclosure. As shown in the figure, a database 200 includes a proxy server 210 (also referred to as a "master node", or "Proxy") and a plurality of nodes for storing user data. In the example shown in the figure, the plurality of nodes include a write node (RW, also referred to as a "read-write node") 220 and a plurality of read nodes (RO, also referred to as a "read only node") 230. Here, the write node refers to a node that can not only perform read (Read) operations on the user data, but also perform write (Write) operations. The read node only performs reading operations on the user data (Read Only). In other words, a database operation solution of the present disclosure is applicable to a distributed cluster architecture. A cluster architecture includes a read-write node (RW) and a plurality of read only nodes (RO) (for example, N pieces shown in the figure, usually more than 1 piece, but less than e.g. 15 pieces). The read-write node processes read and write requests, and the read only node only processes read requests. The failover manner of Active-Active may be adopted between the master node and the read only node to provide a high availability service of the database.

In other words, the architecture shown in FIG. 2 is "write once read many to share the same data". In other words, unlike the "one master many secondary" technology in the prior art where one master library writes, synchronizes data to multiple secondary libraries, and these secondary libraries are then used to complete read access, the write once read many architecture of the present disclosure shares the same data copy without the need to establish multiple additional secondary libraries, so read only nodes may be added quickly (for example, within a few minutes) to start services.

In a database system that supports write once read many, only the write node (RW node) can perform a data reading and writing operations, while the read node (RO node) can only read data, and a writing function is completely prohibited for the RO node. Therefore, in the distributed database system shown in FIG. 2, the master node 210 receives a request from a user (i.e., SQL statement from the user), and forwards SQL that requires a writing operation to the RW node 220 according to a specific type of SQL, and forwards SQL that requires a reading operation to any node, which may be any node in $RO_1$-$RO_N$ or the RW node. In a design of a fully encrypted database system, a data encryption key table located within the database is used to manage and maintain encryption key related information. After the user establishes a SQL connection and before using a full encryption function, the user encryption key related information needs to be securely distributed to a trusted environment of a target node. The trusted environment, i.e., TEE (Trusted Execution Environment), usually provides a secure execution environment that is isolated from an outside world, protecting its codes and data from leakage or malicious tampering. And internally generated or updated encryption key information is written to the database encryption key table of a corresponding node by the trusted environment and synchronized to other nodes by the trusted environment. When the target node is the read node, the encryption key table cannot be written because the target node does not have a writing permission.

To this end, the present disclosure proposes an operating method for a database based on a write once read many database structure, through this method, the problem of writing encryption key information of a read node in a distributed database scenario is solved.

Figure 3:
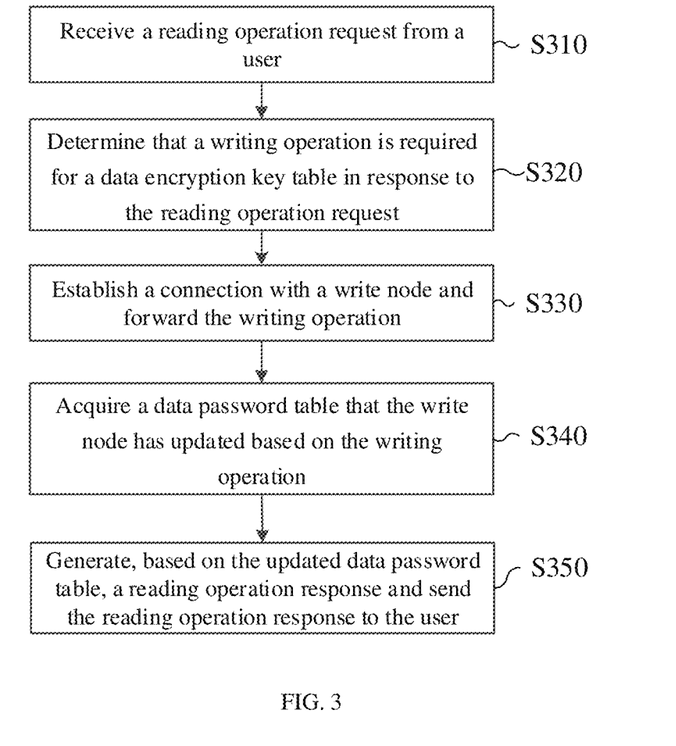
FIG. 3 shows a schematic flow chart of an operating method for a database according to an embodiment of the present disclosure.

FIG. 3 shows a schematic flow chart of an operating method for a database according to an embodiment of the present disclosure. A database applicable to this method is a write once read many fully encrypted database that includes a write node and a plurality of read nodes. For example, as shown in FIG. 2, the write once read many fully encrypted database includes a write node 220 and a plurality of read nodes 230. Each of the write node and the read nodes may store the same user data, for example, multiple data columns encrypted by multiple data encryption keys, and each node includes a data encryption key table for storing encryption key related information. The method shown in FIG. 3 may be executed by the read node, such as any read node 230 shown in FIG. 2.

In step S310, the read node receives a reading operation request from a user. In the above distributed system, a user request that the read node can receive is not a request that directly comes from the user, but a reading operation request of the user that forwarded by a proxy server connected with the write node and the plurality of read nodes in the database. The proxy server identifies SQL (Structured Query Language) of the reading operation request of the user, and only when an operation included in the SQL statement does not involve a writing operation to an encrypted user data stored in the database, the operation will be considered as a reading operation and assigned to a read node.

Subsequently, in step S320, the read node determines that the writing operation is required for a data encryption key table in response to the reading operation request. Here, the data encryption key table stores multiple data encryption keys for encrypting data stored by the user in the database. In some cases, although the SQL statement entered by the user does not involve the writing operation to user data, the above reading operation may involve a change to a data structure of the encrypted user data stored in the database, at this time, the read node may determine the writing operation for the data encryption key table involved in the change.

For example, a current data encryption key table records, for example, M data encryption keys for a data column $C_0$ to a data column $C_{M-1}$, that is, $DEK_0$ to $DEK_{M-1}$. When the user generates new data locally (for example, the data to be stored as a (M+1)th column, an encrypted data column $C_M$ in the database) and needs to upload it to the database, the user needs a new data encryption key to encrypt the data column $C_M$. At this time, the request sent by the user to the database may be to read a data encryption key $DEK_M$ corresponding to the encrypted data column $C_M$. Since the operation included in the request is to read the data encryption key $DEK_M$ corresponding to the encrypted data column $C_M$, the proxy server identifies the request as a read request and distributes the request to a read node. When the read node receives the request, the read node will try to search the data encryption key table on the node and find that the data encryption key $DEK_M$ is not recorded in the current data encryption key table (only M existing data encryption keys are recorded, i.e., $DEK_0$~$DEK_{M-1}$). At this time, since the read node does not have a writing permission, the read node cannot perform a writing to the encryption key table, it is necessary to have the write node participate in a creation of an unrecorded data encryption key $DEK_M$.

If it is determined that writing into the encryption key table is required for the current reading operation, in step S330, the read node establishes a connection with the write node and forwards the writing operation. The establishment of the above connection is performed in a backend, and the read node may directly send the determined operation information of writing into the encryption key table to the write node.

The write node may then update a data encryption key table based on the writing operation. For example, the write node may create the new data encryption key $DEK_M$ based on the user request as described above. Therefore, the read node may acquire the data encryption key table that the write node has updated based on the writing operation in step S340. For example, the write node may synchronize the updated data encryption key table (i.e., the data encryption key table including newly created data encryption key $DEK_M$) to all read nodes. In other words, the updated data encryption key table will not only be sent to the read node that establishes the connection with the write node and forwards the writing operation, but will also be sent to other read nodes.

In step S350, the read node that acquires the above read request involving the data encryption key table writing operation may generate, based on the updated data encryption key table, a reading operation response and send the reading operation response to the user. For example, in the above example, the newly created data encryption key $DEK_M$ is sent to the user making the request.

Therefore, a reliable synchronization update and storage service can be realized using the database's own functions through the read node forwarding an encryption key table update request and the write node updating and synchronizing the encryption key table.

Figure 4:
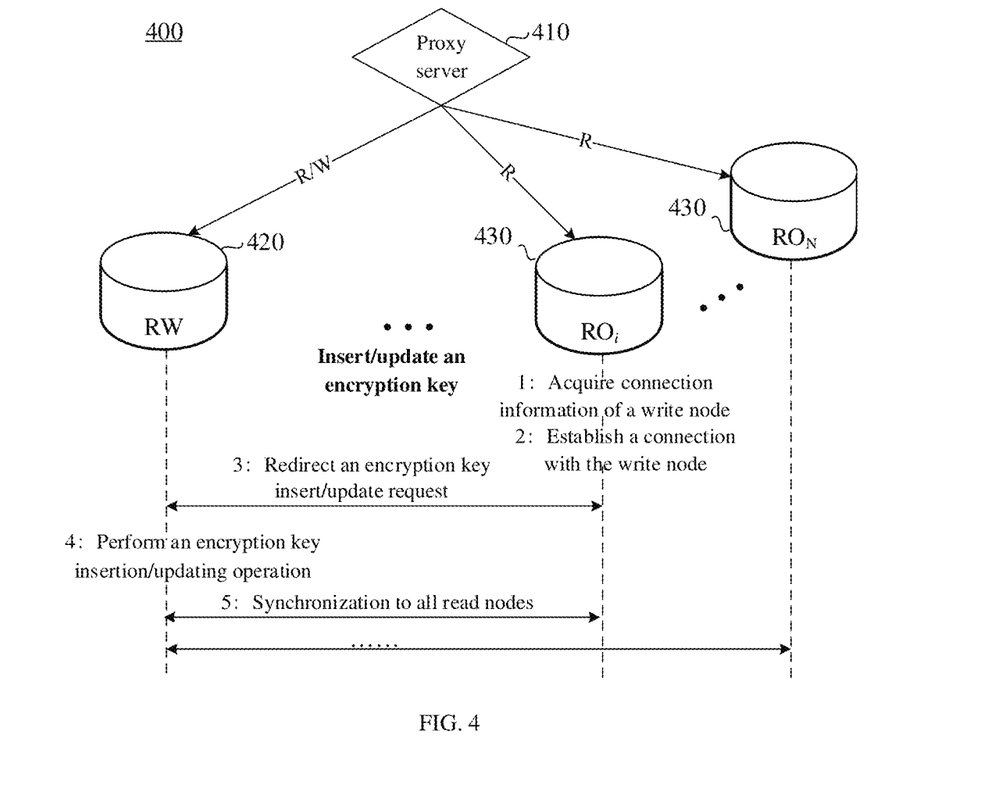
FIG. 4 shows an interaction example when a reading operation on a read node involves an updating of an encryption key table.

Therefore, the writing operations in all encryption key management operations in the current write once read many architecture are executed on the WR node, and the writing operation on the RO node is forwarded to the WR node for execution, and then synchronization to all RO nodes is performed through a kernel. FIG. 4 shows an interaction example when a reading operation on a read node involves an updating of an encryption key table. As shown in the figure, a database 400 also includes a proxy server 410, a write node 420, and multiple read nodes 430. The proxy server 410 distributes a read request to a read node ($RO_i$), the $RO_i$ node determines that a current read request involves an encryption key table updating operation (including a updating and an insertion of an encryption key).

Specifically, the master node (i.e., the proxy server 410 in the figure) forwards SQL to the RO node 430, and the RO node 430 performs a data processing. When writing into the encryption key table needs to be performed, the following steps are performed:
1. acquiring connection information of a RW node;
2. establishing a backend connection from the RO node to the RW node;
3. forwarding (redirecting) the writing operation (Insert/Update) to the encryption key table to the RW node through the backend connection;
4. performing, by the RW node, the writing operation to the encryption key table;
5. after writing, synchronizing, by a synchronization function of a distributed system, updating information to all nodes.

The write once read many as an expansion capability depends on an underlying database cluster having a write once read many capability. At the same time, considering a maintenance cost of multi-version-form products in the design, an introduction of inconsistencies with a stand-alone version database are avoided as much as possible, or the stand-alone/write once read many can be automatically identified, thereby avoiding maintaining multiple different database versions.

A backend connection is established on a database server end. Remote SQL (remote structured query) is allowed to be executed in mainstream functional components (for example, DBLINK and FDW), and mainstream functional components are all standard components of the database. Therefore, from a perspective of encrypted database, using DBLINK and FDW has very good compatibility.

However, since FDW relies on establishing a one-way remote server and mapping table, once a role change between a master database and a secondary database occurs, the existing configuration will become invalid as a result, and an insert operation on the mapping table cannot be reversely synchronized to a source table by the read node, so FDW is not applicable to the write once read many scenario. Thus, DBLINK may be used as an underlying Remote SQL communication solution.

Using the Remote SQL communication solution, the core problem that needs to be solved is to acquire the connection information of establishing the backend connection to the RW node. In other words, in the above step S330, a connection with the write node usually cannot be established directly, the connection information of the write node needs to be acquired, and an authentication needs to be performed to the write node.

Thus, the step S330 of establishing the connection with the write node and forwarding the writing operation may include: acquiring connection address information of the write node and authentication information required to connect to the write node; and establishing, based on the acquired connection address information and the acquired authentication information, a connection with the write node.

Further, the acquiring the connection address information of the write node may include: acquiring the connection address information of the write node from an internal table of a cluster where the write node is located, where the connection address information includes IP address information and port number information of the write node. And the acquiring the authentication information required to connect to the write node may include: acquiring a user name and password information of a built-in role within the database as the authentication information required to connect to the write node.

In other words, when using the Remote SQL communication solution, information required to establish the backend connection with the RW node includes at least:
host: an IP of the WR node
port: a port number of the WR node
user: a user name of a connection target
password: a password of a connection target
dbname: a target library on WR, which is a current library in this solution As a service system, a writing operation forwarding function in the design should not require the user to interactively provide the above required connection information, but should allow a completion of the above process without the user's awareness.

Since the distributed cluster will configure the information of the RW node when establishing each RO node in the cluster, the RO node may obtain the host and port information of the WR node through an internal table/view insertion (if the RO node is connected to the cluster), thus achieving the acquiring of the connection address information of the write node as described above. In the write once read many scenario of the encrypted database, dbname is the current database name.

For the user name and encryption key, out of consideration for user password protection, the password information maintained in the database system will go through two layers of protection: 1) salted Hash (that is, hash changes with random numbers added), and 2) desensitization. Therefore, a plaintext password of the database user cannot be obtained directly in a backend of the server. That is, the plaintext password of the user who makes the read request on a client cannot be obtained. Thus, the user name and password information of the built-in role within the database may be obtained as the authentication information required to connect to the write node. Specifically, the user name and password information of a WalRcv user of the database may be acquired from a global variable WalRcv loaded upon a startup of a node which is as one of the read nodes; and the user name and password information of the WalRcv user may be used as the authentication information required to connect to the write node.

In other words, in order to solve the problem that the read node cannot know the user's plaintext password when verifying its identity to the write node, the present disclosure cleverly reuses a built-in Replication role in the database system. In the database system, the Replication role can normally access the target database and execute an encryption key management function, and the password of this role is statically configured in a configuration file by a database administrator. For example, in a write once read many cluster, there is a special user (recorded as WalRcv user) who is used to pull synchronization logs and has a Replication role permission. The user name and password information of the WalRcv user may be given in a plaintext form in postgresql.conf or recovery.conf file by parameter configuration, and loaded into the global variable WalRcv of a global shared memory when the node starts. Therefore, in a memory of a service process, the read node may obtain complete connection information of the WalRcv user by accessing the global variable WalRcv locally.

Therefore, in a plug-in source code, a connection to the write node may be achieved through the following operations:

1. obtaining the authentication information required for the connection from the global variable WalRcv
2. preparing the connection address information required by DBLINK
3. initiating a dblink function calling through an SPI function, and thus realizing the connection with the write node.

Therefore, the present disclosure does not rely on any external encryption key management system by storing the encryption key related information in the encryption key table within the database, that is, access to the external encryption key management system is avoided, and the user does not need to additionally trust the encryption key management system, shortcomings of the existing technology is avoided innately in the design. In addition, by adopting an internal encryption key table of the database, the encryption key information is treated as ordinary data, and built-in existing functions such as a backup management of the database can be used to provide a stable and reliable storage backup service.

The present disclosure may also be implemented as a fully encrypted database. The fully encrypted database is shown in FIG. 2 and FIG. 4, including a proxy server, a write node and a plurality of read nodes.

The proxy server is configured to acquire a request from a user and distribute the request. The write node is configured to receive a write request from the user distributed by the proxy server and respond to the write request. The plurality of read nodes are configured to receive a read request from the user distributed by the proxy server and respond to the read request and execute the operating method as described above based on FIG. 3.

When the write node updates a data encryption table based on a writing operation, the write node may also be configured to: synchronize, in response to updating the data encryption table based on the writing operation, the updated data encryption table to the plurality of read nodes.

Figure 5:
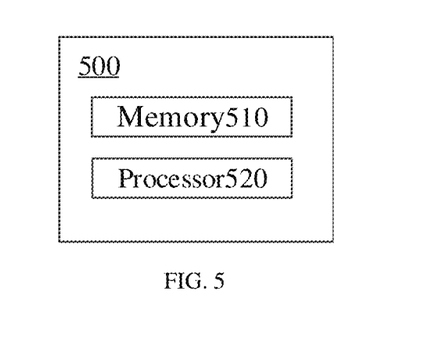
FIG. 5 shows a schematic structural diagram of a computing device that may be used to implement the above operating method for a database according to an embodiment of the present disclosure.

FIG. 5 shows a schematic structural diagram of a computing device that may be used to implement the above operating method for a database according to an embodiment of the present disclosure.

Referring to FIG. 5, a computing device 500 includes a memory 510 and a processor 520.

The processor 520 may be a multi-core processor, or may include multiple processors. In some embodiments, the processor 520 may include a general main processor and one or more special co-processors, such as a graphics processing unit (GPU), a digital signal processor (DSP), and the like. In some embodiments, the processor 520 may be implemented using customized circuits, such as application specific integrated circuits (ASICs) or field programmable gate arrays (FPGAs).

The memory 510 may include various types of storage units, such as a system memory, a read only memory (ROM), and a permanent storage apparatus. ROM may store static data or instructions required by the processor 520 or other modules of the computer. The permanent storage apparatus may be a readable-writable storage apparatus. The permanent storage apparatus may be a non-volatile storage device that will not lose stored instructions and data even a computer is powered off. In some embodiments, the permanent storage apparatus adopts a large-capacity storage apparatus (for example, a magnetic disk or an optical disk, a flash memory) as the permanent storage apparatus. In other embodiments, the permanent storage apparatus may be a removable storage device (for example, a floppy disk, an optical drive). The system memory may be a readable-writable storage device or a volatile readable-writable storage device, such as a dynamic random access memory. The system memory may store some or all of the instructions and data required by the processor when running. In addition, the memory 510 may include a combination of any computer readable storage media, including various types of semiconductor memory chips (DRAM, SRAM, SDRAM, flash memory, programmable read only memory), magnetic disks and/or optical disks may also be adopted. In some embodiments, the memory 510 may include a readable and/or writable removable storage device, such as a compact disc (CD), a read only digital multifunctional disc (for example, DVD-ROM, dual-layer DVD-ROM), read only Blu-ray discs, ultra density discs, flash memory cards (for example, SD cards, min SD cards, Micro-SD cards, and the like), magnetic floppy disks, and the like. The computer readable storage media do not contain carrier waves and transient electronic signals transmitted wirelessly or wired.

Executable codes are stored on the memory 510, and when the executable codes are processed by the processor 520, the processor 520 is caused to execute the operating method for the database described above.

The operating method for the database according to the present disclosure has been described in detail above with reference to the accompanying drawings. The present disclosure proposes a write once read many solution applicable to a fully encrypted database, which solves the problem of writing encryption key information of read nodes in a distributed database scenario. The method proposed by the present disclosure can establish a backend connection without any user awareness, and is applicable to the fully encrypted database based on different TEE enclaves (security zones).

In addition, the method according to the present disclosure may also be implemented as a computer program or computer program product, the computer program or the computer program product includes computer program code instructions for executing the above steps defined in the above method of the present disclosure.

Or, the present disclosure may also be implemented as a non-transitory machine readable storage medium (or computer readable storage medium, or machine readable storage medium), having executable codes (or computer programs, or computer instruction codes) stored thereon, when the executable codes (or computer programs, or computer instruction codes) are executed by a processor of an electronic device (or a computing device, a server, etc.), the processor is caused to execute each step of the above method according to the present disclosure.

Those of skill in the art would further understand that the various exemplarily logical blocks, modules, circuits, and algorithm steps described in connection with the disclosure here may be implemented as an electronic hardware, a computer software, or combinations of the both.

The flowcharts and block diagrams in the figures show the architecture, functionality, and operation that may be implemented according to systems and methods of various embodiments of the present disclosure. In this regard, each block in the flowcharts or block diagrams may represent a module, program segment, or portion of code, the module, program segment, or portion of code contains one or more executable instructions for implementing the specified logical function(s). It should also be noted that, in some alternative implementations, the functions marked in the block may occur in a different order than those marked in the figures. For example, two consecutive blocks may actually be executed substantially in parallel, or they may sometimes be executed in a reverse order, depending on the functionality involved. It should also be noted that each block of the block diagrams and/or flowcharts, and combinations of blocks in the block diagrams and/or flowcharts, may be implemented using a dedicated hardware-based system that executes the specified functions or operations, or may be implemented using a combination of a specialized hardware and computer instructions.

Various embodiments of the present disclosure have been described above, the above illustration is exemplary, not exhaustive, and is not limited to the disclosed embodiments. Many modifications and variations are apparent to those skilled in the art without departing from the scope and spirit of the illustrated embodiments. The terms used herein are chosen to best explain principles, practical applications, or improvements to technologies in the market, or to enable other persons of ordinary skill in the art to understand the various embodiments disclosed herein.

The invention claimed is:

1. An operating method for a database, wherein the database is a write once read many fully encrypted database comprising a write node and a plurality of read nodes, wherein the method comprises:

receiving a reading operation request from a user;
determining that a writing operation is required for a data encryption key table in response to the reading operation request, wherein the data encryption key table stores multiple data encryption keys for encrypting data stored by the user in the database;
establishing a connection with the write node and forwarding the writing operation;
acquiring the data encryption key table that the write node has updated based on the writing operation; and
generating, based on the updated data encryption key table, a reading operation response and sending the reading operation response to the user.

2. The method according to claim 1, wherein the receiving the reading operation request from the user comprises:

receiving the reading operation request from the user forwarded by a proxy server connected to the write node and the plurality of read nodes in the database, wherein the reading operation request does not involve a writing operation on encrypted user data stored in the database.

3. The method according to claim 2, wherein the determining that the writing operation is required for the data encryption key table in response to the reading operation request comprises:

determining that the reading operation involves a change to a data structure of the encrypted user data stored in the database; and
determining the writing operation for the data encryption key table involved in the change.

4. The method according to claim 1, wherein the establishing the connection with the write node and forwarding the writing operation comprises:

acquiring connection address information of the write node and authentication information required to connect to the write node; and
establishing, based on the acquired connection address information and the acquired authentication information, a connection with the write node.

5. The method according to claim 4, wherein the acquiring the connection address information of the write node comprises:

acquiring the connection address information of the write node from an internal table of a cluster where the write node is located, wherein the connection address information comprises IP address information and port number information of the write node.

6. The method according to claim 4, wherein the acquiring the authentication information required to connect to the write node comprises:

acquiring a user name and password information of a built-in role within the database as the authentication information required to connect to the write node.

7. The method according to claim 6, wherein the acquiring the user name and the password information of the built-in role within the database as the authentication information required to connect to the write node comprises:

acquiring, from a global variable WalRcv loaded upon a startup of a node which is as one of the read nodes, a user name and password information of a WalRcv user of the database; and
using the user name and the password information of the WalRcv user as the authentication information required to connect to the write node.

8. A fully encrypted database, comprising:

a proxy server, configured to acquire a request from a user and distribute the request; and a write node, configured to receive a write request from the user distributed by the proxy server and respond to the write request; and a plurality of read nodes, configured to receive a read request from the user distributed by the proxy server and respond to the read request, and to execute the operating method according to claim 1.

9. The database according to claim 8, wherein the write node is further configured to:

synchronize, in response to updating the data encryption table based on the writing operation, the updated data encryption table to the plurality of read nodes.

10. A computing device, comprising:

a processor; and a memory, having executable codes stored thereon, wherein when the executable codes are executed by the processor, the processor is caused to:

receive a reading operation request from a user;

determine that a writing operation is required for a data encryption key table in response to the reading operation request, wherein the data encryption key table stores multiple data encryption keys for encrypting data stored by the user in a database;

establish a connection with a write node of the database and forwarding the writing operation;

acquire the data encryption key table that the write node has updated based on the writing operation; and generate, based on the updated data encryption key table, a reading operation response and sending the reading operation response to the user.

11. A non-transitory machine readable storage medium, having executable codes stored thereon, wherein when the executable codes are executed by a processor of an electronic device, the processor is caused to:

receive a reading operation request from a user;

determine that a writing operation is required for a data encryption key table in response to the reading operation request, wherein the data encryption key table stores multiple data encryption keys for encrypting data stored by the user in a database;

establish a connection with a write node of the database and forwarding the writing operation;

acquire the data encryption key table that the write node has updated based on the writing operation; and generate, based on the updated data encryption key table, a reading operation response and sending the reading operation response to the user.

12. The computing device according to claim 10, wherein the processor is configured to:

receive the reading operation request from the user forwarded by a proxy server connected to the write node and a plurality of read nodes in the database, wherein the reading operation request does not involve a writing operation on encrypted user data stored in the database.

13. The computing device according to claim 12, wherein the processor is further configured to:

determine that the reading operation involves a change to a data structure of the encrypted user data stored in the database; and determine the writing operation for the data encryption key table involved in the change.

14. The computing device according to claim 10, wherein the processor is further configured to:

acquire connection address information of the write node and authentication information required to connect to the write node; and establish, based on the acquired connection address information and the acquired authentication information, a connection with the write node.

15. The computing device according to claim 14, wherein the processor is further configured to:

acquire the connection address information of the write node from an internal table of a cluster where the write node is located, wherein the connection address information comprises IP address information and port number information of the write node.

16. The computing device according to claim 14, wherein the processor is further configured to:

acquire a user name and password information of a built-in role within the database as the authentication information required to connect to the write node.

17. The computing device according to claim 16, wherein the processor is further configured to:

acquire, from a global variable WalRcv loaded upon a startup of a node which is as one of read nodes, a user name and password information of a WalRcv user of the database; and use the user name and the password information of the WalRcv user as the authentication information required to connect to the write node.

18. The non-transitory machine readable storage medium according to claim 11, wherein when the executable codes stored on the non-transitory machine readable storage medium are executed by the processor of the electronic device, the processor is configured to:

receive the reading operation request from the user forwarded by a proxy server connected to the write node and a plurality of read nodes in the database, wherein the reading operation request does not involve a writing operation on encrypted user data stored in the database.

19. The non-transitory machine readable storage medium according to claim 18, wherein when the executable codes stored on the non-transitory machine readable storage medium are executed by the processor of the electronic device, the processor is further configured to:

determine that the reading operation involves a change to a data structure of the encrypted user data stored in the database; and determine the writing operation for the data encryption key table involved in the change.

20. The non-transitory machine readable storage medium according to claim 11, wherein when the executable codes stored on the non-transitory machine readable storage medium are executed by the processor of the electronic device, the processor is further configured to:

acquire connection address information of the write node and authentication information required to connect to the write node; and establish, based on the acquired connection address information and the acquired authentication information, a connection with the write node.

* * * * *